(12) United States Patent
Davin

(10) Patent No.: US 10,245,528 B2
(45) Date of Patent: Apr. 2, 2019

(54) DEVICE FOR SKIMMING A SURFACE FLUID

(71) Applicant: TECHNIP FRANCE, Courbevoie (FR)

(72) Inventor: Michel Davin, Berville sur Seine (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/524,710

(22) PCT Filed: Nov. 6, 2015

(86) PCT No.: PCT/EP2015/075986
§ 371 (c)(1),
(2) Date: May 5, 2017

(87) PCT Pub. No.: WO2016/071517
PCT Pub. Date: May 12, 2016

(65) Prior Publication Data
US 2017/0319983 A1    Nov. 9, 2017

(30) Foreign Application Priority Data
Nov. 7, 2014    (FR) ..................................... 14 02578

(51) Int. Cl.
*C02F 1/40*    (2006.01)
*B01D 17/02*   (2006.01)
*E02B 15/10*   (2006.01)

(52) U.S. Cl.
CPC ............ *B01D 17/0214* (2013.01); *C02F 1/40* (2013.01); *E02B 15/106* (2013.01)

(58) Field of Classification Search
CPC ...... B01D 17/0214; C02F 1/40; E02B 15/106
(Continued)

(56) References Cited

U.S. PATENT DOCUMENTS 1,107,391 A * 8/1914 Welch .................. E02B 15/106
                                                    210/242.3
3,675,771 A     7/1972 McKee ........................... 210/83
(Continued)

FOREIGN PATENT DOCUMENTS

CN        101116785 A     2/2008
CN        203079722 U     7/2013
(Continued)

OTHER PUBLICATIONS

International Search Report dated Feb. 11, 2016 in corresponding PCT International Application No. PCT/EP2015/075986.
(Continued)

*Primary Examiner* — Christopher Upton
(74) *Attorney, Agent, or Firm* — Ostrolenk Faber LLP

(57) ABSTRACT

A device (10) for a skimming operation for petrochemical or chemical fluid storage or process tanks working by gravitation, comprising buoyancy means (20), means (30) for collecting surface fluid to be skimmed including an opening (31) emerging just above the interface between the fluid with density d1 and the fluid with density d2, as well as connection means (32), and discharge means (40) for the collected surface fluid. The discharge means (40) includes at least two flexible pipes (41, 42) connected symmetrically to the connection means (32) and extending vertically in the fluid with density d2 toward the bottom of the tank.

10 Claims, 6 Drawing Sheets

(58) Field of Classification Search
USPC .................. 210/122, 242.3, 540, 776, 923
See application file for complete search history.

(56) References Cited

U.S. PATENT DOCUMENTS

| | | | | |
|---|---|---|---|---|
| 3,745,115 | A | | 7/1973 | Olsen .............................. 210/83 |
| 4,405,458 | A | | 9/1983 | McHugh, Jr. .............. 210/242.3 |
| 4,892,666 | A | * | 1/1990 | Paulson ............. B01D 17/0214 |
| | | | | 210/242.3 |
| 4,998,585 | A | | 3/1991 | Newcomer et al. .......... 166/105 |
| 5,352,356 | A | * | 10/1994 | Murphy ............. B01D 17/0214 |
| | | | | 210/122 |
| 5,366,629 | A | | 11/1994 | Mori et al. ................. 210/242.3 |
| 5,378,376 | A | * | 1/1995 | Zenner ............... B01D 21/2433 |
| | | | | 210/776 |
| 5,451,330 | A | * | 9/1995 | Garrett ............... B01D 17/0214 |
| | | | | 210/242.3 |
| 5,820,751 | A | * | 10/1998 | Faircloth, Jr. ...... B01D 21/2444 |
| | | | | 210/122 |
| 6,077,423 | A | * | 6/2000 | Roy ................... B01D 17/0214 |
| | | | | 210/121 |
| 6,183,654 | B1 | * | 2/2001 | Terrien ............... B01D 17/0214 |
| | | | | 210/776 |
| 7,790,023 | B1 | * | 9/2010 | Mills .................. B01D 21/2444 |
| | | | | 210/122 |
| 2008/0251441 | A1 | | 10/2008 | Gibbs ........................ 210/242.3 |

FOREIGN PATENT DOCUMENTS

| | | |
|---|---|---|
| DE | 1 634 091 A1 | 5/1970 |
| FR | 2 452 549 A1 | 10/1980 |
| NL | 7713456 A | 6/1979 |
| WO | WO 92/03383 * | 5/1992 |

OTHER PUBLICATIONS

Written Opinion dated Feb. 11, 2016 in corresponding PCT International Application No. PCT/EP2015/075986.
Chinese Office Action and Search Report, dated Sep. 5, 2018, issued in corresponding Chinese Patent Application No. 201580071258.3. English translation. Total 9 pages.

* cited by examiner

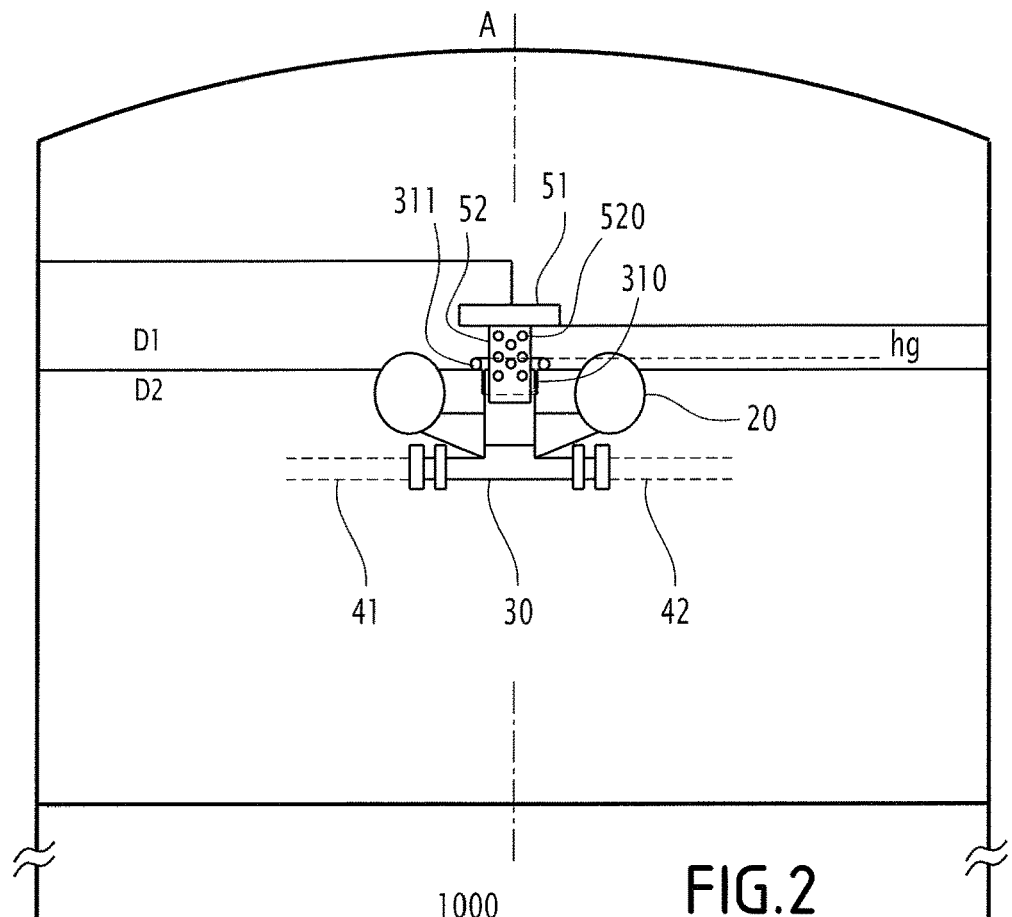
FIG.2
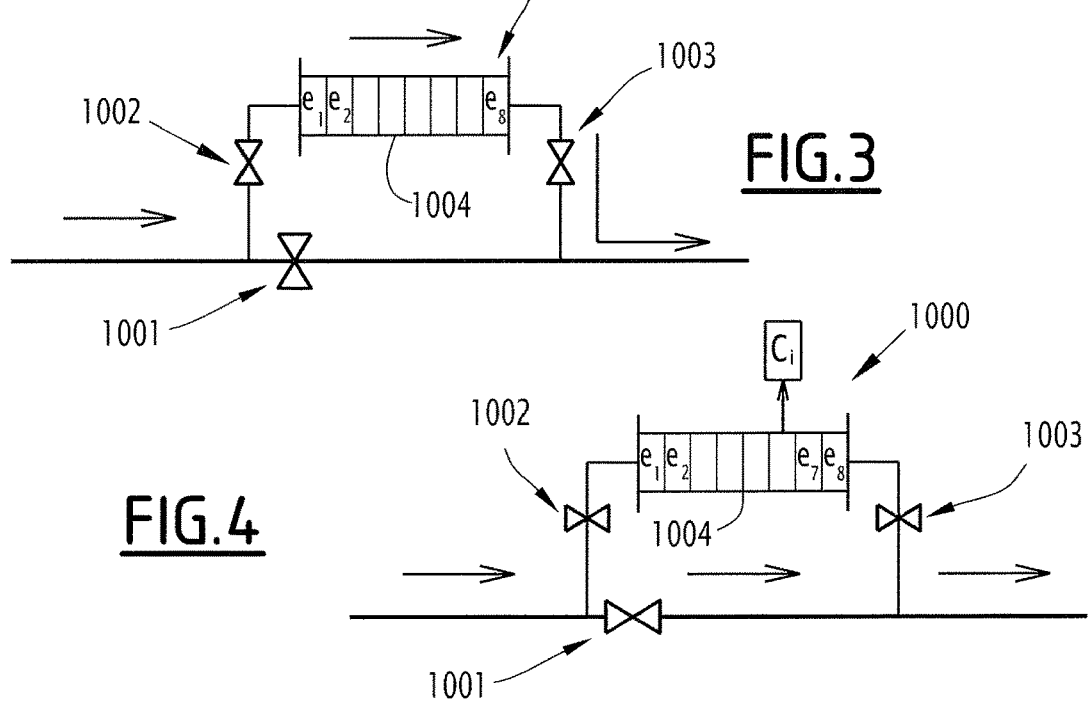
FIG.3
FIG.4

DEVICE FOR SKIMMING A SURFACE FLUID

CROSS-REFERENCE TO RELATED APPLICATIONS

The present application is a 35 U.S.C. §§ 371 national phase conversion of PCT/EP2015/075986, filed Nov. 6, 2015, which claims priority to French Patent Application No. 14 02578, filed Nov. 7, 2014, the contents of which are incorporated herein by reference. The PCT International Application was published in the French language.

TECHNICAL FIELD

The present invention relates to a device for a skimming operation for petrochemical or chemical storage or fluid process tanks as well as a skimming method associated with the use of the device.

BACKGROUND OF THE INVENTION

It is known from the state of the art to use skimming devices, also called skimmers, to remove a fluid with a low density spread over the surface of another fluid with a higher density, or primary fluid. The primary fluid is for example a petrochemical or chemical fluid contained in a tank or by digression, a large expanse of liquid such as an ocean.

The low-density fluid is generally a fluid that one wishes to separate from the primary fluid to next discharge it, then store it in an auxiliary tank for later use or for later depollution treatment to make it less harmful for humans and/or to recycle it. The low-density fluid can also be a foam or a pollutant that one wishes to separate from the primary fluid, then discharge to a specific sewer.

Among the existing skimming devices, the device described in French application FR 2,452,549 includes a spillway intended to collect the surface fluid and a vat intended to discharge said fluid toward the storage tank. The surface fluid is sent toward the vat when a nappe occurs at the threshold of the spillway. One drawback of this device is that it does not allow precise collection of only the surface fluid. Indeed, as long as the thickness of the fluid situated on the surface is relatively large, the device can skim it without difficulty. Conversely, once the interface between the surface fluid and the primary fluid becomes too small, the device will skim both the surface fluid and the primary fluid.

Likewise, but in the case of use in an offshore marine environment, the device for recovering a petrochemical surface layer described by American U.S. Pat. No. 3,745,115 makes it possible, through the presence of holes arranged in the outer framework of its structure, to collect, then discharge a seawater-oil mixture. In the case at hand, this device does not make it possible to collect and discharge only the petrochemical layer present on the surface of the seawater.

Consequently, once the skimming operation is complete, these devices cannot prevent and/or prohibit accidental or untimely skimming of a certain volume of primary fluid.

In Dutch patent application NL 7,713,456, the disclosed skimming device comprises a valve able to be actuated based on the height of the surface fluid present in the fluid storage vat.

Furthermore, the large majority of skimmers used to treat storage vats are kept in position using one or several guiding posts installed permanently in the vat.

These guiding posts have the drawbacks of being cumbersome and not removable. They therefore cannot be used for floating roof vats, vats whose height is intended to vary based on the volumes of fluids present inside.

Consequently, these guiding posts are intended to stabilize the skimmer horizontally and vertically when it rests on a layer of surface fluid.

However, when the skimmer is for example stabilized using a mechanical connection of the ball and socket joint type or the linear rectilinear type, or using a flexible coupler, destabilization may occur, and from there, blocking of the device during the skimming operation.

SUMMARY OF THE INVENTION

The present invention aims to resolve all or some of the aforementioned drawbacks, and relates to a device for skimming petrochemical or chemical fluid storage tanks working by gravitation, the petrochemical or chemical fluid having a density $d2$ and being covered by a surface fluid with a density $d1$ lower than $d2$, the device comprising:
- buoyancy means floating at the interface between the fluid with density $d1$ and the fluid with density $d2$;
- means for collecting surface fluid to be skimmed including an opening emerging just above the interface between the fluid with density $d1$ and the fluid with density $d2$, the collection means being connected to the buoyancy means, and connection means submerged in the fluid with density $d2$, able to be connected to discharge means; and
- means for discharging the collected surface fluid, the discharge means being connected to the connection means of the collecting means and extending vertically in the fluid with density $d2$ toward the bottom of the tank, wherein the discharge means comprise at least two flexible pipes connected symmetrically to the connection means.

Thus, such a feature according to the invention allows better control of the skimming operation of the layer of fluid spreading across the surface of the other fluid with a higher density.

The skimming device according to the invention may comprise one or more of the following features, considered alone or according to any technically possible combination(s):
- advantageously, the at least two flexible pipes are arranged in a "Chinese lantern" configuration. One thus improves the horizontal and vertical stability of the skimming device.
- It includes means for adjusting the skimming height of the surface fluid with density $d1$ relative to the interface between the fluids with density $d1$ and $d2$ fastened at the opening of the collecting means. Thus, the skimming of the surface fluid is made more reliable, and collection of the primary fluid is avoided.
- the adjusting means is fastened on an outer surface of the collecting means.
- the adjusting means is fastened on an inner surface of the collecting means.
- advantageously, the device includes means for closing off the opening of the collecting means. One thus slightly further improves the reliability of the skimming operation.
- the closing off means comprises a float with a diameter larger than the diameter of the opening of the collecting means floating on the surface of the fluid with density $d1$ and a guide element fastened below the float able to cooperate with the collecting means and to slide vertically inside the opening, following the height variations of the surface fluid during the skimming operation.

the guide element of the closing off means include openings to collect the surface fluid with density d1 to be skimmed.

The invention also relates to a method for skimming a petrochemical or chemical fluid storage tank using the device as defined above, including the following successive steps:

a) collecting surface fluid with density d1 present in the tank through openings of the guide element using the closing off means and causing the flow of said fluid in the discharge means;

b) sliding of the guide element inside the opening between a high position (ph) where the surface fluid has not yet been skimmed and a low position (pb) where the surface fluid has been skimmed; and c) closing off the openings of the guide element.

The method for skimming the tank may comprise the following feature:

after step c), the float rests on the opening of the collecting means.

The invention also relates to a device for a skimming operation for petrochemical or chemical fluid storage tanks operating by gravitation comprising:

separating means, including:
an upper body topped by a first buoyancy means;
a lower body equipped with a second buoyancy means and having an upper end;
the upper body being able to slide relative to the lower body, between an initial position and a terminal position;
discharge means connected to the lower body of the separating means,
wherein the first buoyancy means is in permanent contact with the upper end of the lower body when the upper body, after sliding, is in the terminal position.

Furthermore, the invention may comprise one or more of the following features:

advantageously, the upper body of the separating means is perforated over a certain portion. Preferably, the entire upper body is perforated.

the upper end of the lower body of the separating means comprises a protruding portion. Advantageously, the protruding portion has a frustoconical surface.

a protecting element is screwed on the upper end of the lower body of the separating means.

the protecting element is screwed on the inner surface of the upper end.

alternatively, the protecting element is screwed on the outer surface of the upper end.

the protecting element is provided with a semicircular piece forming a bead.

the discharge means of the skimming device comprise at least two flexible pipes.

the at least two flexible pipes are installed in a "Chinese lantern" configuration. The general stability of the device is thus improved.

BRIEF DESCRIPTION OF THE DRAWINGS

The invention will be better understood in light of the following description, in reference to the appended drawings, in which:

FIG. 2 is a partial perspective schematic view of an alternative embodiment of the device of FIG. 1;

FIG. 3 is a schematic view of a monitoring system according to a first operating mode;

FIG. 4 is a schematic view of a monitoring system according to a second operating mode;

DESCRIPTION OF PREFERRED EMBODIMENTS

Figure 1:
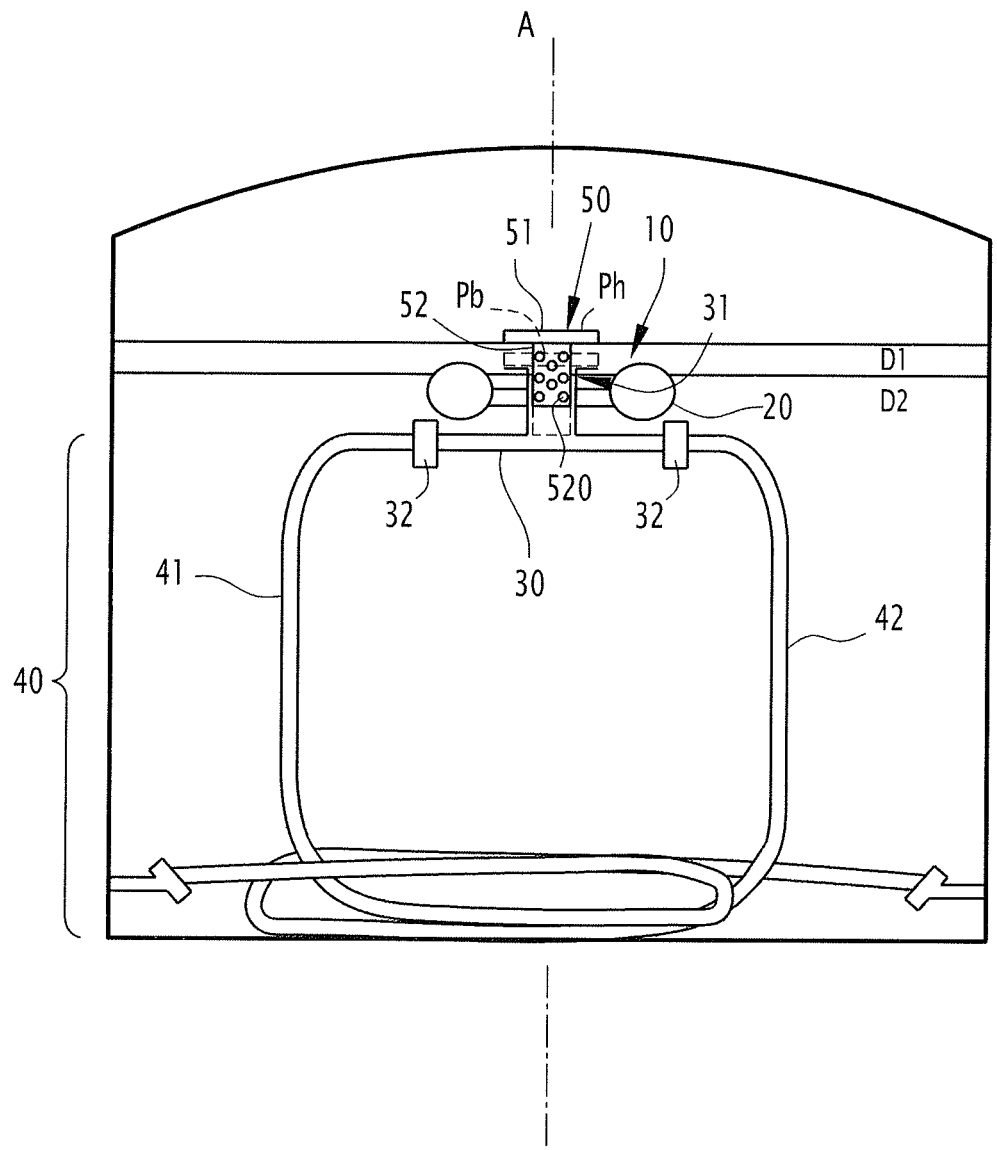
FIG. 1 is a partial schematic view of the device according to the invention.

FIG. 1 shows a storage or process tank for a petrochemical or chemical fluid with density d2, above which a layer of a surface fluid with density d1 is visible, as well as a skimming device 10 intended to remove the layer with density d1 and discharge it toward the outside of the tank. The skimmed fluid can next be stored in an auxiliary vat or tank for subsequent recycling or be sent to a specific sewer.

The device 10 comprises buoyancy means 20 that allow it to float in the fluid with density d2, near the interface between the surface fluid with density d1 and the petrochemical or chemical fluid with density d2.

The buoyancy means 20 are for example made in the form of an element with any geometry. Preferably, however, they are made in the form of two elements with any geometry, spaced angularly apart by an angle of 180° around a central vertical axis A of the device 10. The two elements are thus axially symmetrical relative to the vertical axis A. From there, the stability of the skimming device 10 is improved at its float plane situated near the interface between the fluids with densities d1 and d2.

The elements making up the buoyancy means 20 can be made from a material with a density higher than that of the surface fluid, for example a syntactic foam.

The elements making up the buoyancy means 20 can also be floats of variable volume depending on whether one wishes to come closer to or move further from the interface between the fluid with density d1 and the fluid with density d2. The floats are for example tanks, such as metal cans made from aluminum or stainless steel. In particular, the floats here extend parallel to one another on either side of the vertical axis A.

The buoyancy means 20 are sized based on the nature of the primary fluid with density d2, more specifically based on its density.

The device further comprises collecting means 30 connected to the buoyancy means 20. The collecting means 30 make it possible to collect the surface fluid with density d1 to be skimmed.

The collecting means 30 include an opening 31 emerging near the interface between the two fluids with respective densities d1 and d2, above this interface, in the fluid with density d1.

The collecting means 30 also include connection means 32 submerged in the primary fluid with density d2.

Advantageously, the opening 31 comprises a protruding portion. The protruding portion plays an important role during the operation of the skimming device 10, since it makes it possible to prevent the fluid with density d2 from being collected by the collecting means 30. The skimming operation is thus made more reliable.

The protruding portion forms a right angle with the collecting means 30 of the device 10. The protruding portion can for example assume the form of a collar.

Alternatively, the protruding portion is flared relative to the collecting means 30. For example, it has a frustoconical geometry.

Lastly, the device 10 comprises discharge means 40 for the surface fluid that are connected to the connection means 32 of the collecting means 30. The discharge means 40 extend vertically in the primary fluid with density d2, from the connection means 32 toward the lower part of the tank. The discharge means 40 are connected to at least one outlet arranged in the lower part of the storage tank, on its wall or directly on the bottom. The at least one outlet arranged in the tank is in turn connected to an auxiliary tank or to a specific sewer (not shown).

The discharge means 40 work by gravity, which means that the fluid with density d1 to be skimmed flows without the assistance of a pump, from the top of the storage tank through the device 10 toward the auxiliary tank situated outside.

The discharge means 40 comprise at least two flexible pipes 41, 42 connected symmetrically to the connection means 32 of the device 10. Thus, by symmetrical distribution of the forces, the horizontal stability of the skimming device 10 is improved.

The at least two flexible pipes 41, 42 have a small diameter. The diameter is comprised between 3 inches (7.62 centimeters) and 12 inches (30.48 centimeters).

The at least two flexible pipes 41, 42 are preferably flexible pipes used for refining operations, also called DRAPS (Drilling and Refining Application Pipes), manufactured and sold by the Applicant. This type of flexible pipe has a particular structure, since the outer layer of their structure is a metal carcass made from steel formed by winding several strips stapled to one another.

Advantageously, the pipes 41, 42 are arranged in a "Chinese lantern" configuration. In this type of configuration, the pipes 41, 42 connected to the connection means 32 describe symmetrical downward helical trajectories relative to the vertical axis A while going toward the at least one outlet arranged in the bottom of the tank, as illustrated in FIGS. 5 to 7.

Figure 5:
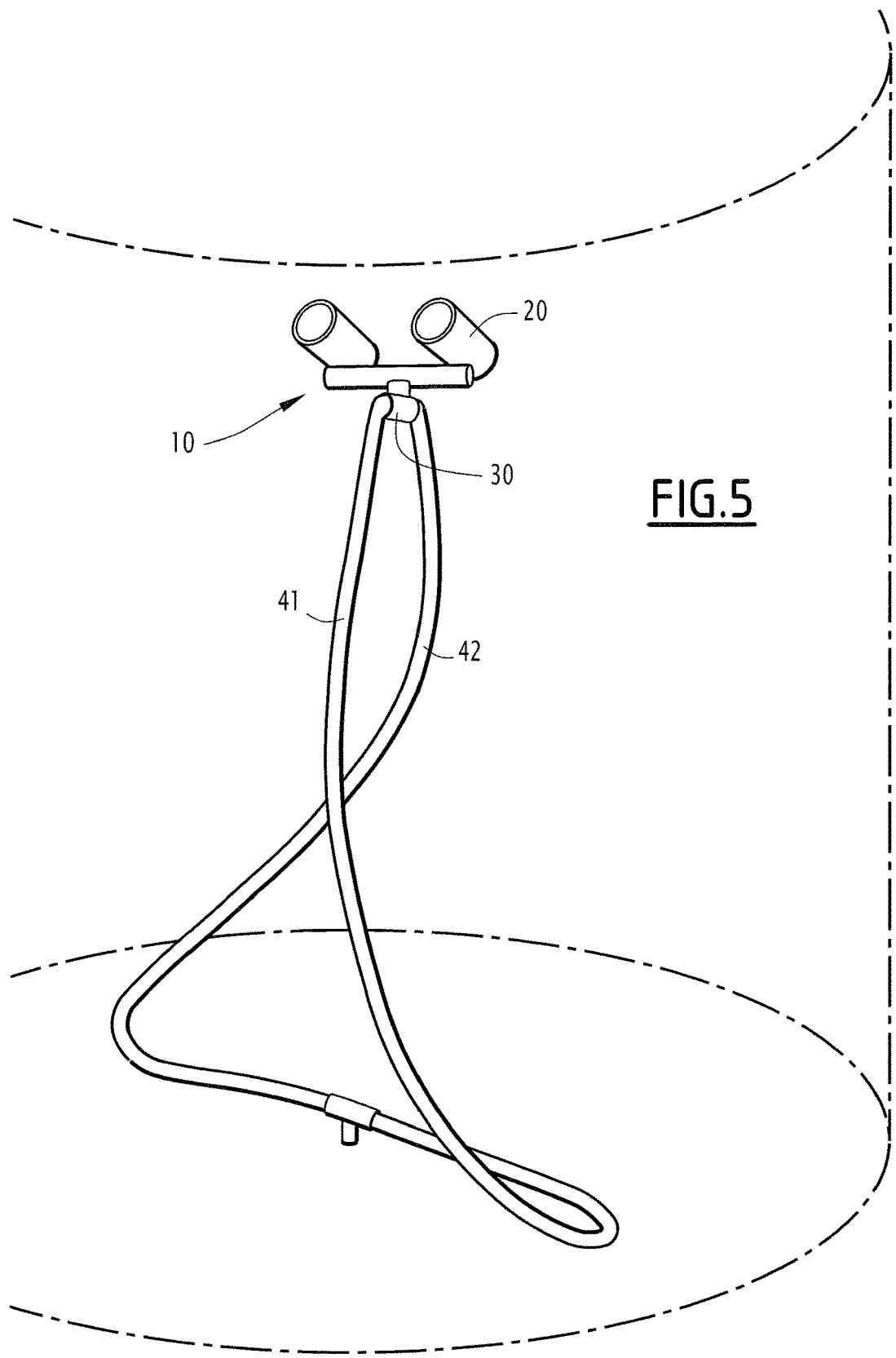
FIG. 5 is a schematic view of the device according to the invention in a first skimming position.
Figure 6:
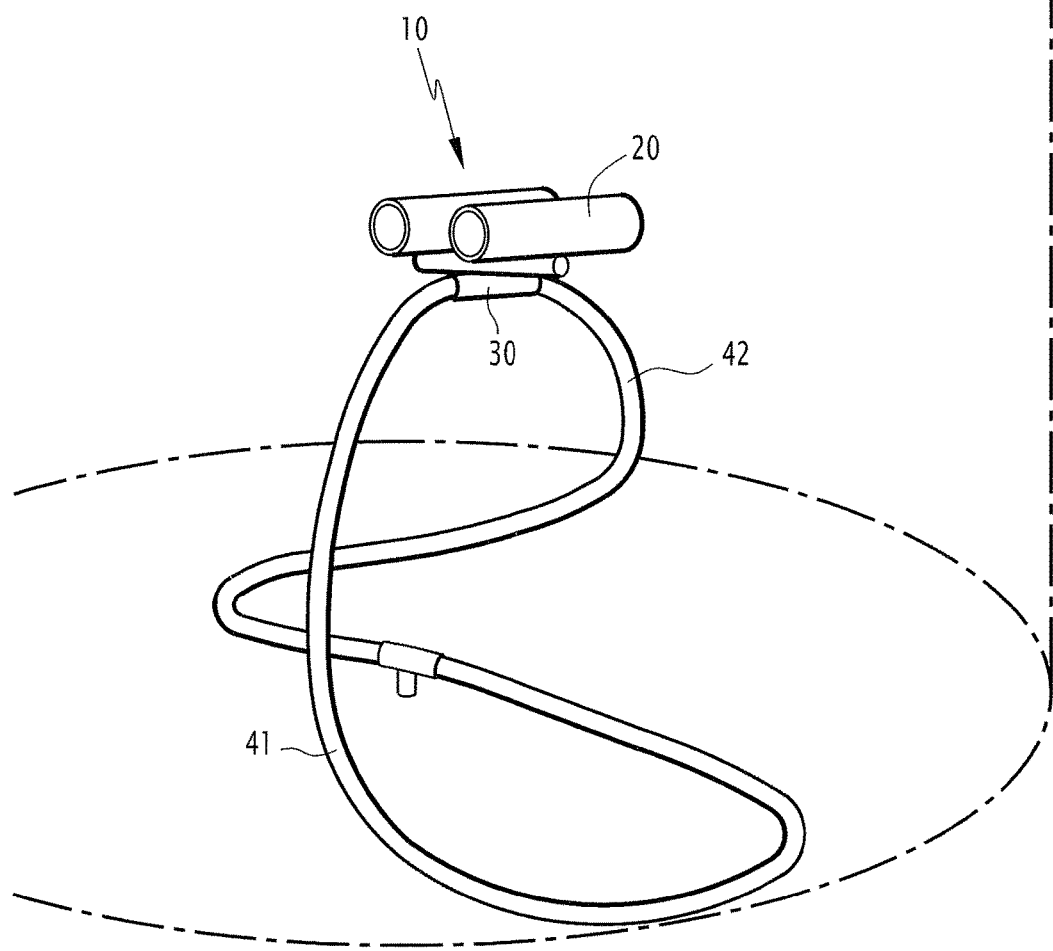
FIG. 6 is a schematic view of the device of FIG. 5 in a second skimming position.
Figure 7:
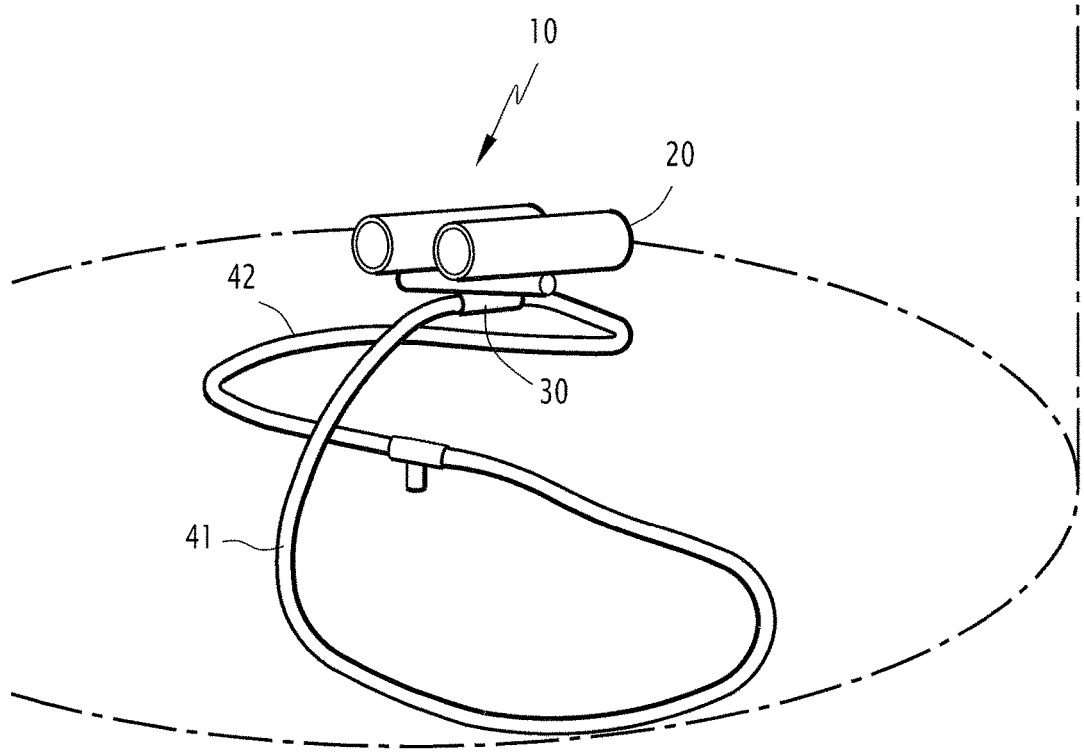
FIG. 7 is a schematic view of the device of FIG. 5 in a third position.

FIGS. 5 to 7 make it possible to illustrate the advantages imparted by the "Chinese lantern" configuration of the flexible pipes 41, 42 with respect to the skimming device 10.

FIG. 5 schematically illustrates the skimming device 10 according to the invention inside a petrochemical or chemical fluid storage tank, in a first skimming position. In the first position, the height of the primary fluid with density d2 in the tank is significant. The pipes 41, 42 are connected symmetrically relative to the vertical axis A to the connection means 32 of the collecting means 30, on either side of the connection means 32. The pipes 41, 42 extend toward the bottom of the tank following a downward helical trajectory. This trajectory provides symmetry to the device around the central axis A and gives it good equilibrium, good buoyancy. Owing to this configuration, one eliminates the use of additional guiding and/or support elements such as a metal post fixed vertically in the vat to guide the device or a safety strap to keep the discharge means horizontally and vertically stable, as described in the Floated Oil Skimmer brochure published by the company ATECO.

In FIG. 6, the device 10 is in a second skimming position. In this second position, the height of the primary fluid with density d2 in the tank is lower, causing the flexible pipes 41, 42 to rest on the bottom of the tank. As one can see, a certain length of the pipes 41, 42 rests symmetrically on the bottom of the tank. Furthermore, the bulk of the pipes 41, 42 on the bottom of the tank is controlled and is contained in a reduced footprint. This is due to the trajectories formed by the flexible pipes 41, 42 in the tank combined with their flexibility. Even with a decrease in height of the primary fluid, the symmetry of the pipes 41, 42 relative to the axis A is preserved and the skimming device 10 retains good buoyancy.

In FIG. 7, the device 10 is in a third skimming position. In this third position, the height of the primary fluid with density d2 in the tank is even slightly lower than that illustrated in FIG. 6, causing a greater length of the flexible pipes 41, 42 to rest on the bottom of the tank. Here again, the symmetry of the device 10 relative to the central axis A is preserved, like the buoyancy of the device 10. Consequently, the bulk of the pipes 41, 42 on the bottom of the tank is still controlled and remains contained in a reduced footprint.

The buoyancy means 20 ensure the buoyancy of the device 10 and take up the weight of the pipes 41, 42. The buoyancy means 20, the collecting means 30 and the connection means 32 are driven exclusively by the pipes 41, 42, which guide them during their descent along the vertical axis.

In one preferred alternative embodiment of the invention, the skimming device 10 includes a means 50 for closing off the collecting means 30. The closing off means 50 comprises a float 51 as well as a guide element 52 fastened below the float 51. The float 51 floats on the surface of the layer of surface fluid with density d1, at the interface between the fluid with density d1 and the surrounding atmosphere prevailing inside the storage tank. The surrounding atmosphere is generally an inert gas such as nitrogen (N2).

The float 51 preferably has a diameter larger than the diameter of the opening 31 of the collecting means 30.

The guide element 52 is able to cooperate with the collecting means 30 and to slide vertically inside the opening 31, following the height variations of the surface fluid during the skimming operation.

The closing off means 50, more specifically the float 51 and the guide element 52, have a cylindrical shape, but can both adopt any geometric shape.

However, it is important for the geometry of the guide elements 52 to be complementary to the geometry of the opening 31 of the collecting means 30 so that they can cooperate with one another.

Advantageously, retaining means (not shown) are provided on the collecting means 30 and on the closing off means 50 in order to prevent the latter from being completely ejected outside the collecting means 30.

To that end, a collar is provided at the lower end of the guide element 52 and a shoulder is provided at the upper end of the collecting means 30, near the opening 31.

The shoulder thus forms a stop for the collar if the guide element 52 slides in an extreme manner until it risks being ejected outside the collecting means 30.

Advantageously, the guide element 52 of the closing off means 50 comprises openings 520 to collect the surface fluid to be skimmed. The openings 520 are for example orifices arranged in the element 52 or slots arranged on the outer surface of the element 52.

The openings 520 are provided over a certain height of the guide element 52. Preferably, however, the entire guide element 52 is provided with openings 520.

The sliding is predominant in the operation of the device 10 because it allows the closing off means 50 to remain in contact with the surface fluid and to follow the variations in thickness of this fluid during the skimming operation.

Thus, the separation of the fluids with densities d1 and d2 is improved as a result, since the skimming of the surface fluid is more precise.

The feature according to which the guide elements 52 can slide relative to the collecting means represents an even bigger advantage to improve the skimming of the layer of surface fluid when the densities d1 and d2 are approximately equal.

The closing off means 50 is made from a material with a density significantly lower than the density d1 so as to obtain a floating mobile assembly. For example, the material can be selected from among syntactic foams or metal materials, such as aluminum and stainless steels.

In another embodiment of the invention as shown in FIG. 2, the opening 31 of the collecting means 30 does not comprise protruding portions.

However, the collecting means 30 include an adjusting means 310 fastened at the opening 31. The outer surface of the collecting means 30 includes a thread allowing the fastening and subsequent adjustment of the adjusting means 310.

The adjusting means 310 makes it possible to establish a guard level or guard height (hg) between the interface between the fluids with densities d1 and d2 and its upper end. From there, it is possible to adjust the height of the surface fluid that one wishes to leave on the surface of the primary fluid with precision. Generally, the remaining surface fluid height is about a centimeter at most.

The guard level is configurable depending on whether the primary level with density d2 is driven by convection movements.

Indeed, the more the primary fluid is agitated (calm, respectively), the more the adjusting means 310 will be unscrewed (screwed, respectively) so as to establish a greater or lesser guard level.

The adjusting means 310 is made from aluminum or stainless steel.

The adjusting means 310 has a tubular shape. Advantageously, it is further provided at its upper end with a semicircular piece 311 forming a bead.

The bead 311 is made from an aluminum or stainless steel half-tube attached on the adjusting means by a welding operation.

The adjusting means 310, more particularly the bead 311, makes it possible to ensure that no volume of fluid with density d2 is collected during the skimming operation.

The bead 311 forms an obstacle to any surface movement at the interface between the respective fluids with densities d1 and d2 capable of causing the fluid with density d2 to overflow above the adjusting means, inside the collecting means 30.

Figure 8:
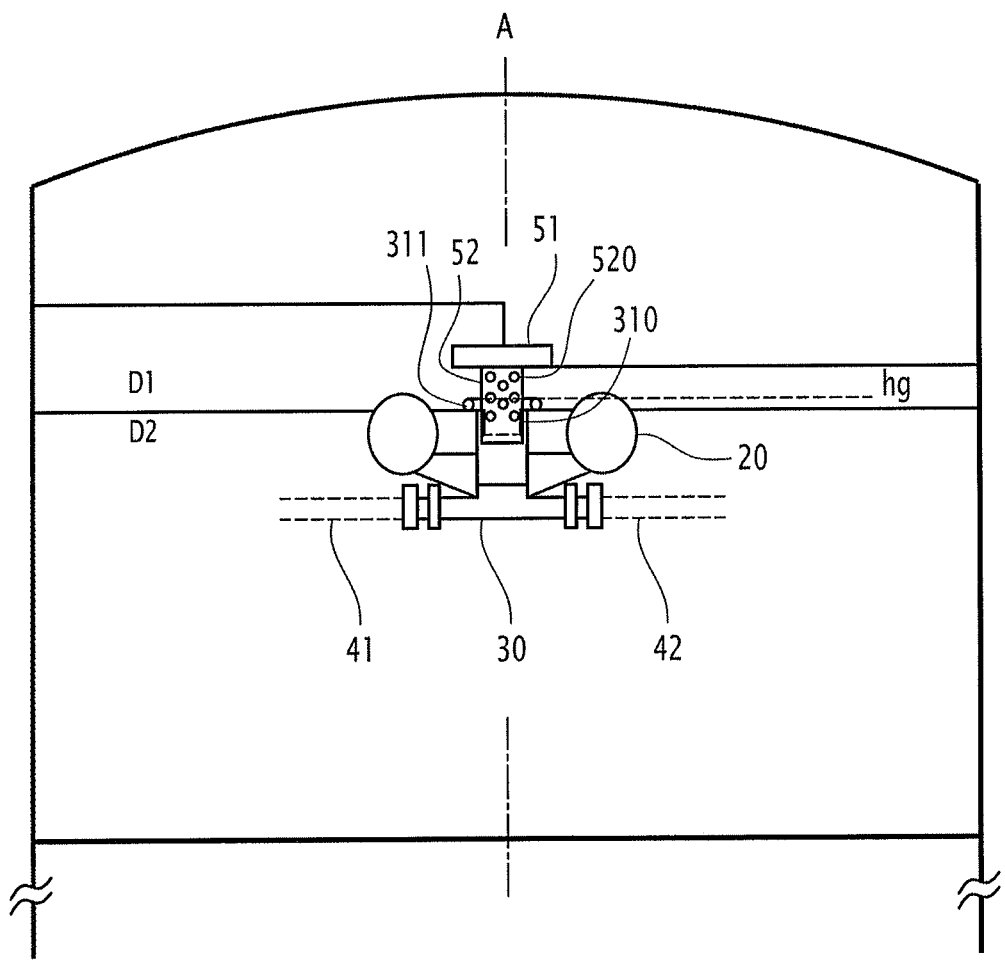
FIG. 8 is a schematic view of a device according to FIG. 2 with an adjuster fastened on an inner surface of the collector.

According to another alternative as shown in FIG. 8, the inner surface of the collecting means 30 is threaded to allow the fastening and subsequent adjustment of the adjusting means 310.

Of course, it is fully possible to consider combining the technical features of the device 10 shown in FIG. 1 with those of the device 10 shown in FIG. 2.

The invention also relates to a method for skimming petrochemical or chemical storage or fluid process tanks using the skimming device described above. More specifically, the method that will be described relates to the use of the device 10 according to the alternative embodiment including a means 50 for closing off the opening 31 of the collecting means 30.

Before the skimming operation of the surface fluid begins, the collecting means 30 of the skimming device 10 are in a first so-called "high position" (ph). In the high position, the surface fluid has not yet been skimmed. At this moment, the float 51 of the closing off means 50 floats on the surface of the surface fluid with density d1, while the guide element 52 is submerged in the surface fluid.

Next and throughout the entire duration of the skimming operation, the surface fluid is collected through the openings 520 of the guide element 52. The fluid then flows through the collecting means 30 up to the discharge means 40 in order to be discharged outside the storage tank toward an auxiliary tank.

At the same time, the guide element 52 slides inside the opening 31 of the collecting means 30 as the height of the fluid with density d1 decreases until it only forms a small film of about a centimeter.

The thickness of the film remaining on the surface of the primary fluid is controllable and adjustable. The thickness of the film is adjusted based on possible convection movements by agitation of the fluid with density d2, in order to prevent the skimming device 10 from collecting the fluid with density d2.

During the skimming, the device 10 moves vertically while following the decrease in thickness of the layer of surface fluid. Consequently, the device 10 does not undergo any horizontal movement, except in the case where the primary fluid, for specific reasons, must be driven in a convection movement through an agitator.

At the end of the skimming operation, when the surface fluid has been skimmed and only a very small film remains on the surface of the fluid with density d2 in the storage tank, the guide element 52 of the closing off member 50 is then in a second so-called "low position" (pb). In the low position, the surface fluid has been skimmed.

In the low position, the element 52 no longer slides in the opening 31 of the collecting means 30. The openings 520 are closed off by the collecting means 30.

Consequently, the float 51 of the closing off means 50 rests on the opening 31 of the collecting means 30 and closes off the access thereto. From there, any fluid collection in the collecting means 30 is avoided. The device 10 thus no longer risks accidentally collecting all or part of the fluid with density d2.

The materials used to manufacture the skimming device 10 according to the invention are selected, then tested at length during the design phase. The tests make it possible to study their chemical resistance to the fluids with which they are placed in contact later.

These tests are carried out with the aim of manufacturing a maintenance-free skimming device 10.

Nevertheless, although these materials have good chemical compatibility with the tested fluids, the possibility is provided of installing a monitoring system as shown in FIGS. 3 and 4, to monitor their aging in real time.

The monitoring system 1000 comprises an arrangement of several opening-closing means 1001, 1002, 1003 and an analyzer 1004. The operation of the system 1000 will be described below.

The monitoring system 1000 is an online system installed outside the storage vat, at the outlet arranged in the lower part of the tank. The monitoring system is inserted between the outlet of the vat and the auxiliary tank or the sewer.

It allows continuous monitoring, i.e., without needing to stop the skimming operation.

The opening-closing means 1001, 1002, 1003 are for example butterfly valves, sliding gate valves, guillotine valves, etc., allowing or prohibiting the passage of the surface fluid skimmed during the operation.

The analyzer 1004 includes a support compartmentalized into a plurality of slots $e_i$; i=1 ... n. The slots $e_i$ are provided to accommodate at least one sample $c_i$ of the material to be tested.

The at least one sample $c_i$ can assume different forms. It may for example be provided in the form of a plate, disc, cylinder, etc.

The monitoring system 1000 is intended to monitor the chemical resistance over time of the materials making up the device 10, the device being intended to remain permanently in the storage vat irrespective of whether it is necessary to perform a skimming operation.

More specifically, the chemical resistance is monitored of the polymer material making up part of the flexible pipe 41, 42 and that is in permanent contact with the layer of surface fluid with density d1, which may for example be a foam formed by the reaction between the primary fluid with density d2 and the surrounding gaseous atmosphere.

Indeed, the physicochemical and mechanical properties of the surface fluid may deteriorate, by chemical reaction, over a longer or shorter term. This chemical reaction then causes the natural or premature aging of the flexible pipe 41, 42, and consequently harms the proper unfolding of the skimming operation.

To that end, the system 1000 makes it possible to monitor the evolution over time of the aging of the polymer material of the flexible pipe 41, 42 through quantitative measurements. From there, it is possible to make a precise prediction of the right moment to replace them.

FIG. 3 describes the monitoring system 1000 according to a first operating mode, or "service mode".

When the monitoring system 1000 is in "service mode", the valve 1001 is in the closed position and the valves 1002, 1003 are in the open position. Thus, the valve 1001 forces the passage of the surface fluid discharged from the storage vat through the analyzer 1004.

The at least one sample $c_i$ housed in one of the compartments $e_i$ is then placed in contact with the surface fluid. One thus causes the aging of the at least one sample $c_i$.

Conversely, FIG. 4 describes the monitoring system 1000 according to a second operating mode, or "analysis mode".

When the monitoring system 1000 is in "analysis mode", the valve 1001 is in the open position and the valves 1002, 1003 are in the closed position. In this way, the surface fluid discharged during the skimming operation leaves directly toward the auxiliary tank or the sewer.

The "analysis mode" is used mainly when one wishes to monitor the aging of the at least one sample $c_i$ positioned in the analyzer 1004. As shown in FIG. 4, at least one of the samples $c_i$ is removed from its slot $e_i$ to be analyzed.

The sample $c_i$ is analyzed quantitatively. For example, the loss of plasticizer and/or the variation in viscosity between the sample in the initial state, i.e., before any contact with the surface fluid, and the sample at moment t, after it has been exposed for a certain number of hours, months or years to the surface fluid, is measured.

Thus, if a maximum loss of plasticizer and/or viscosity variation has been determined, beyond which the integrity of the material is considered no longer to be sufficient, and this undermines the proper performance of the skimming operation, the flexible pipes 41, 42 are then renewed.

Of course, the embodiments described above are provided solely as non-limiting examples. Other alternative embodiments may be done without going beyond the scope of the invention.

As an example, it is entirely appropriate to use the skimming device currently described and claimed in the present application for any other related application, connected to the technical field of its primary use.

Indeed, in the case of a fixed roof storage tank containing a primary fluid such as a chemical or petrochemical product, a surrounding atmosphere charged with inert gas is situated above the primary fluid.

The inert gas is intended to limit the risks of combustion of the chemical or petrochemical product in case of formation of an electric arc between a lightning strike and the storage tank. This then makes it possible to prevent an explosion from occurring and a fire from spreading.

Thus, in the scenario where the primary fluid catches fire, the device according to the invention would be entirely capable of working opposite its usual operation.

Indeed, it is possible to imagine that an auxiliary tank containing a pressurized extinguishing foam could be connected to the outlet arranged in the lower part of the fixed roof storage tank, and therefore to the flexible pipes of the skimming device.

Thus, in case of fire, the skimming device is stopped from performing its usual function and an auxiliary device then triggers the release of the pressurized extinguishing foam.

The extinguishing foam is then propelled through flexible pipes to ultimately be expelled through the openings provided in the guide element of the closing off means of the skimming device.

The extinguishing foam is thus deposited quickly and uniformly on the surface of the primary fluid, unlike a traditional device for injecting foam from the upper part of the storage vat.

The invention claimed is:

1. A device for skimming petrochemical or chemical fluid storage tanks working by gravitation, the device presenting a central vertical axis, the petrochemical or chemical fluid having a density d2 and being covered by a surface fluid with a density d1 lower than d2, the device comprising:
    a buoyancy apparatus floating at an interface between the fluid with density d1 and the fluid with density d2;
    a collector for collecting surface fluid to be skimmed including an opening emerging above the interface between the fluid with density d1 and the fluid with density d2, the collector being connected to the buoyancy apparatus, and a connector submerged in the fluid with density d2; and
    a discharger for discharging the collected surface fluid, the discharger being connected to the connector of the collector and extending vertically in the fluid with density d2 toward the bottom of the tank, the discharger comprising at least two flexible pipes connected symmetrically to the connector, the device being maintained in the tank without a guiding post, at least one part of each flexible pipe resting on the bottom of the tank.

2. The device according to claim 1, wherein the at least two flexible pipes are arranged in a Chinese lantern configuration in which the flexible pipes describe symmetrical downward helical trajectories relative to the central vertical axis while going toward the bottom of the tank.

3. The device according to claim 1, including an adjuster for adjusting a skimming height of the surface fluid with density d1 relative to the interface between the fluids with density d1 and d2 fastened at the opening of the collector.

4. The device according to claim 3, wherein the adjuster is fastened on an outer surface of the collector.

5. The device according to claim 3, wherein the adjuster is fastened on an inner surface of the collector.

6. The device according to claim 1, including a closing off apparatus for closing off the opening of the collector.

7. The device according to claim 6, wherein the closing off apparatus comprises a float with a diameter larger than the diameter of the opening of the collector floating on the surface of the fluid with density d1, the device comprising a guide fastened below the float, the guide being configured to cooperate with the collector and to slide vertically inside the opening, following height variations of the surface fluid during the skimming operation.

8. The device according to claim 7, wherein the guide of the closing off apparatus includes openings to collect the surface fluid with density d1 to be skimmed.

9. A method for skimming a petrochemical or chemical fluid storage tank comprising:
   a) providing a device according to claim 8,
   b) collecting surface fluid with density d1 present in the tank through openings of the guide using the closing off apparatus and causing the flow of said fluid in the discharger;
   c) sliding of the guide inside the opening between a high position where the surface fluid has not yet been skimmed and a low position where the surface fluid has been skimmed; and
   d) closing off the openings of the guide.

10. The skimming method according to claim 9, wherein after step d, the float rests on the opening of the collector.

* * * * *